March 8, 1966  A. A. HURWITZ  3,238,629
PRICING GAUGE FOR BOLTS AND NUTS
Filed Aug. 5, 1964  2 Sheets-Sheet 1

INVENTOR.
ABRAHAM A. HURWITZ
BY
Victor J. Evans & Co.
Attorneys

Fig. 1.

March 8, 1966 A. A. HURWITZ 3,238,629
PRICING GAUGE FOR BOLTS AND NUTS
Filed Aug. 5, 1964 2 Sheets-Sheet 2
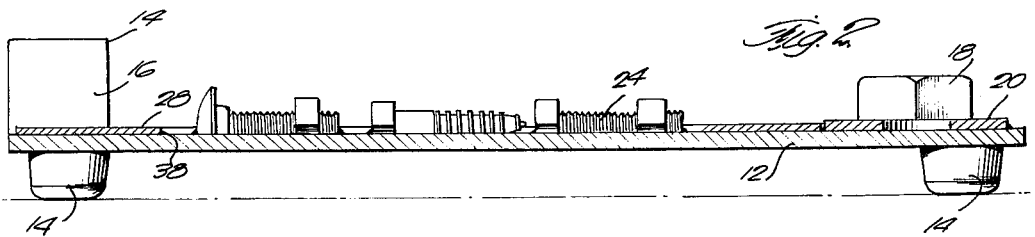
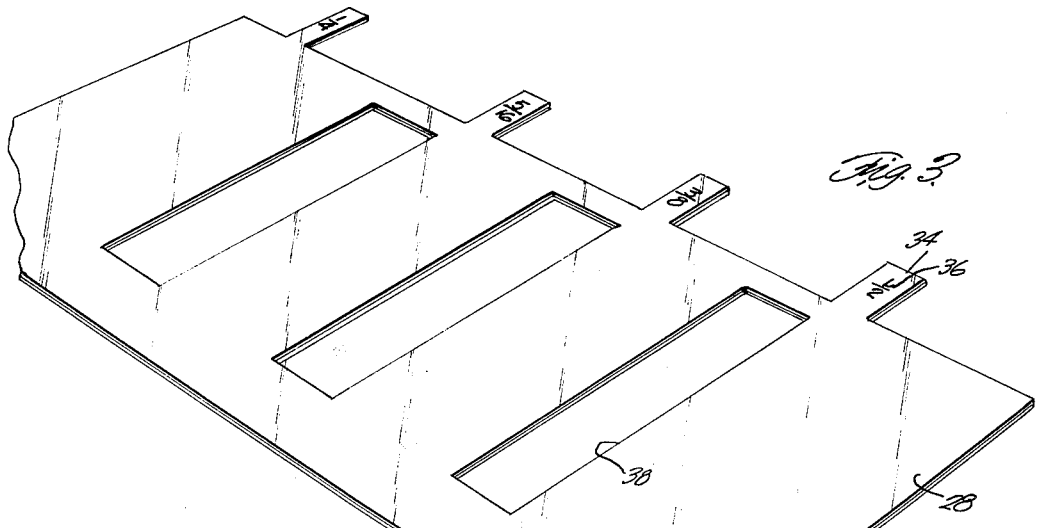
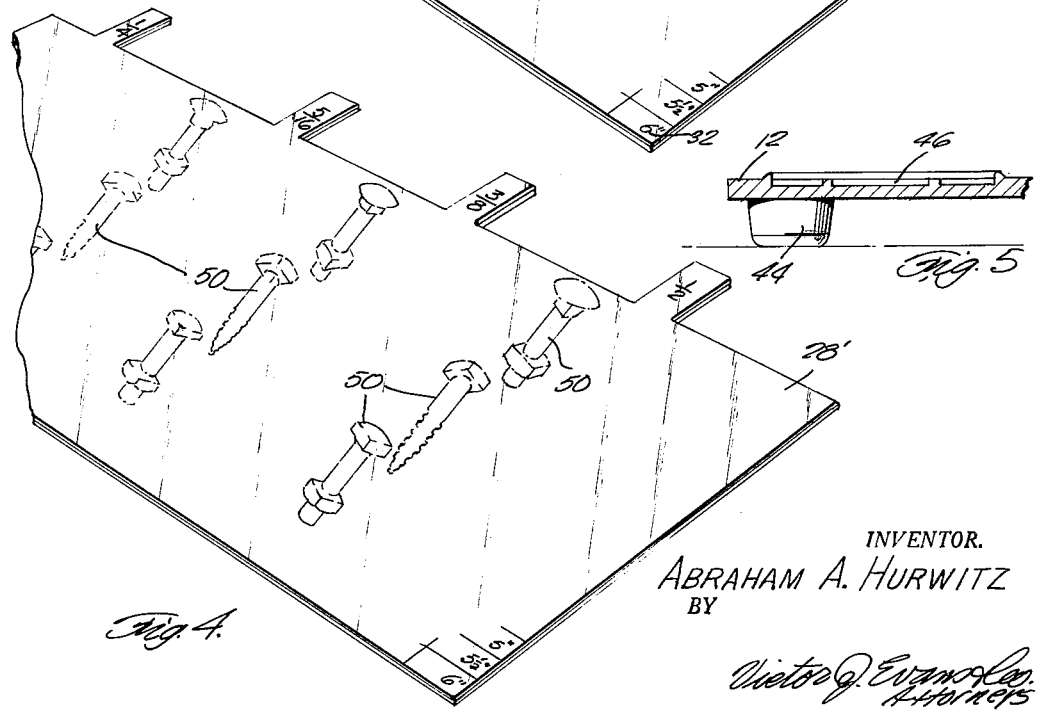
INVENTOR.
ABRAHAM A. HURWITZ
BY

United States Patent Office 3,238,629
Patented Mar. 8, 1966

3,238,629
PRICING GAUGE FOR BOLTS AND NUTS
Abraham A. Hurwitz, 367 Edgewood Ave.,
New Haven, Conn.
Filed Aug. 5, 1964, Ser. No. 387,617
5 Claims. (Cl. 33—174)

The present invention generally relates to a device for assisting in identifying and indicating the price and size of bolts and nuts and more particularly to a pricing gauge for bolts and nuts.

An object of the present invention is to provide a pricing gauge for bolts and nuts in the form of a plate-like member having a notched projection thereon in which the notches are sized to receive different sized bolts together with indicia designating the length and price of the bolts.

A further object of this invention is to provide a pricing gauge having a replaceable price sheet associated therewith for enabling the device to be used with various types of bolts and nuts.

Another object of the present invention is to provide a pricing gauge that is simple in construction, easy to use, timesaving and relatively inexpensive to manufacture.

Other objects and advantages of the invention will be apparent during the course of the following description, in which:

FIGURE 1 is a plan view of the pricing gauge of the present invention;

FIGURE 2 is a transverse sectional view of the pricing gauge taken substantially along section line 2—2 of FIGURE 1;

FIGURE 3 is a perspective view of a component of the pricing gauge;

FIGURE 4 is a perspective view similar to FIGURE 3 but illustrating an optional component; and FIGURE 5 is a detailed sectional view of a portion of the gauge.

Referring specifically to the drawings, the pricing gauge 10 includes a generally rectangular panel or plate 12 constructed of suitable material such as wood, metal, plastic, heavy cardboard or the like.

Along one edge, normally the top edge, there is provided a forwardly projecting ledge or projection 14 having a plurality of notches or recesses 16 formed therein which are progressively wider from the left side toward the right side of the panel 12.

Mounted across the bottom of the panel 12 is a plurality of groups of nuts 18 and washers 20 together with indicia 22 associated therewith to indicate the price of each item and in some instances the size designation thereof especially where the diameter of the hole in the washer 20 is concerned.

Embedded partially in the top surface of the panel 12 is a plurality of groups of bolts 24 in vertical alignment together with indicia 26 designating the type of bolt disposed alongside of the bolts 24. Mounted on the top surface of panel 12 is a price sheet 28 having horizontal graduations 30 with indicia 32 designating the length of the bolt inserted into a notch 16 with the head against the upper surface of the projection 14. The price sheet has tabs 34 extending into the notches 16 having indicia 36 designating the width of the notch and the diameter of a bolt inserted into the respective notches. Also, the sheet 28 has slot-like openings 38 therein for revealing the bolts 24 and indicia 26 and a plurality of vertical rows of price indicia 40 having a designating indicia 42 at the upper end thereof to indicate the price of each type bolt received in the notch disposed to the right of the indicia 40. Actually, the price sheet 28 may be a typewritten sheet of paper with a transparent overlay sheet of plastic or the like which may be temporarily secured in place by tape or adhesive backing or the like.

The panel 12 is supported by legs or feet 44 at the corners thereof which may be secured in place by glueing, screw fasteners or the like. Also, in lieu of partially embedding the bolts, nuts and washers or glueing them on, properly shaped recesses such as at 46 in FIGURE 5 may be used for partially receiving the same, thus facilitating the gauging of the items. As shown in FIGURE 4, the price sheet 28' may be solid and have pictorial representations 50 of bolts and nuts which are properly sized to provide an indicating means for such items.

As is well known, the sale of nuts, bolts, and washers has been a difficult time-consuming job and relatively unprofitable for a hardware store handling such merchandise. However, with this construction, the salesman can quickly compute the price for such items, thus rendering them economically feasible to handle.

I claim:

1. A pricing gauge for nuts, bolts, washers and the like comprising a generally rectangular panel having a projection along the upper edge thereof, a plurality of spaced notches in said projection for receiving bolts therein; said notches being progressively individually wider for receiving different sized bolts, indicia spaced from said notches and disposed on the panel for indicating the length of a bolt received in a notch, and additional indicia on the panel indicating the price of each bolt; said indicia being mounted on a pricing sheet detachably secured to the panel for enabling changing thereof.

2. A pricing gauge for nuts, bolts, washers according to claim 1 wherein said panel includes a plurality of nuts and washers mounted thereon, and price-designating indicia on the panel associated with the nuts and washers.

3. A pricing gauge for nuts, bolts, washers according to claim 1 wherein said panel includes a plurality of groups of different size bolts partially embedded therein.

4. A pricing gauge for nuts, bolts, washers according to claim 1 wherein said panel includes sized recesses for receiving items for indicating the size thereof.

5. A pricing gauge for nuts, bolts, washers according to claim 1 wherein said panel is supported by corner legs and having the projection integral therewith.

References Cited by the Examiner

UNITED STATES PATENTS

| | | | |
|---|---|---|---|
| 1,396,509 | 11/1921 | Faltermayer | 33—201 |
| 1,647,877 | 11/1927 | McIntyre | 40—28 |
| 1,860,174 | 5/1932 | Cronk | 33—174 |
| 1,950,469 | 3/1934 | Barwood | 33—178 |
| 2,728,145 | 12/1955 | Holladay | 33—199 |
| 2,830,380 | 4/1958 | Rumonoski | 33—199 |
| 2,896,333 | 7/1959 | Kivela | 33—178 |
| 2,981,005 | 4/1961 | Moe | 33—178 |

OTHER REFERENCES

Tooling and Production, August 1955, center column, page 148.

ISAAC LISANN, *Primary Examiner.*

SAMUEL S. MATTHEWS, *Examiner.*